C. M. Flint,
Head Block.

No. 110,451. Patented Dec. 27, 1870.

Witnesses
S. N. Piper
L. N. Möller

Charles M. Flint
by his attorney
R. H. Eddy

United States Patent Office.

CHARLES M. FLINT, OF HANCOCK, NEW HAMPSHIRE.

Letters Patent No. 110,451, dated December 27, 1870.

IMPROVEMENT IN SAW-MILLS.

The Schedule referred to in these Letters Patent and making part of the same.

*To all persons to whom these presents may come:*

Be it known that I, CHARLES M. FLINT, of Hancock, of the county of Hillsborough, of the State of New Hampshire, have made a new and useful invention, having reference to Machinery for Sawing Lumber; and I do hereby declare the same to be fully described in the following specification, and represented in the accompanying drawing, of which—

Figure 1:
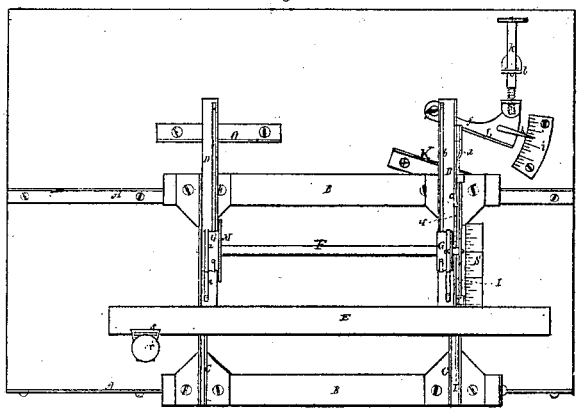
Figure 3:
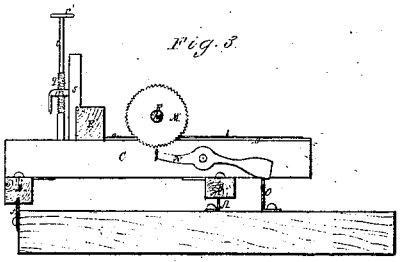
Figure 2:
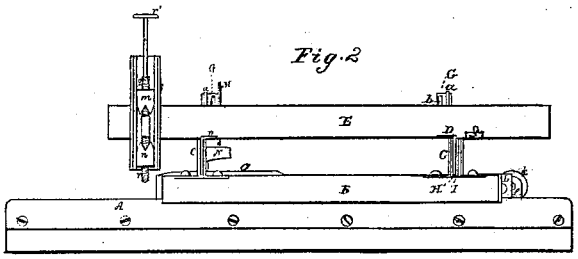
Figure 4:
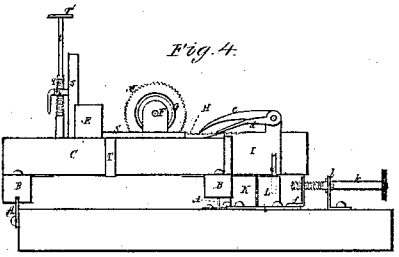

Figure 1 is a top view;
Figure 2, a front elevation;
Figure 3, a transverse section; and
Figure 4, an end elevation of the mechanism involving my invention, the purpose of such mechanism being to hold or support a log and move it forward to a saw, as occasion may require, for sawing it up into boards or lumber.

In the drawing—

A A denote parallel guide-ways or rails, having upon them a carriage, B, it being applied to them so as to be capable of being moved longitudinally on them by the usual means employed to move a saw-carriage relatively to the saw.

The carriage B has two grooved ways, C C, constituting part of it, and extending across it parallel to each other.

Two bars, D D, of "angle-iron," are arranged within such ways, C C, and are connected at their front ends to a long log-bar or carrier, E, which serves to support the log-clamping or dogging mechanism to be hereinafter described.

A horizontal shaft, F, pivoted to the carriage B, and arranged therewith in manner as represented, carries two wheels, G G, which are arranged directly over the two bars D D, each wheel being connected to the bar D beneath it by means of two steel belts or bands, *a b*. These bands, attached at or near one end of each to the periphery of the wheel, wind in opposite directions about such periphery, and at their outer ends are fastened to the said bar D.

To one of the angle-bars D a toothed rack, H, is affixed.

A bar, I, arranged within the supporter C of the said bar D so as to be capable of sliding longitudinally, has two pawls, *c d*, pivoted to it, such pawls being made to rest on the rack H, one being at the root of a tooth of it, while the other is at the middle of another tooth.

A stud, *e*, extended down from the slide I during the advance of the carriage B, will be carried against a stationary inclined plane or cam, K, arranged as represented, and by such the pawl-slider will be retracted.

During the retreat or back movement of the carriage on its rails the said stud will be carried against another, but adjustable inclined plane or cam, L, arranged as represented.

This cam projects upward from an arm, *f*, which turns on a pivot, *g*, and causes an index pointer, *h*, to move along a divided scale, *i*.

A tangent-screw, *k*, properly applied to the arm, and a standard, *l*, serves to move the arm, and thereby adjust the cam L, as may be desirable.

By the action of the said cam the pawl-slider will be moved forward so as to advance the rack, and thereby cause, by the aid of the shaft-wheels and bands, as hereinbefore described, an advance movement of the bar E.

Furthermore, there is fixed on the shaft F a spur-wheel, M, with which a weighted catch-lever, N, pivoted to the carriage B, operates.

While the stud *e* may be moving by either of the cams K L, the catch-lever will be held out of engagement with the spur-wheel by a cam, O, arranged as represented; but as soon as the longer arm of the catch-lever may pass off the said cam O, such arm will drop and move the catch-arm up into engagement with the spur-wheel, and thereby hold the shaft from being revolved, and of course the bar E, from being moved laterally, while it may be further moved to carry a log into action with the saw, which is to be supposed to be arranged in a proper position for sawing lengthwise through the log "dogged" to the said bar.

There may be affixed to the said bar a scale or graduated arm, S, by which, with an indicator, T, projected from the carriage B, the extent of lateral movement of the bar may be ascertained at any time. This scale and the indicator may be employed to aid with the adjusting mechanism of the cam L in effecting the proper adjustment of the cam to cause it to give any requisite movement to the pawl-slide. Therefore, in connection with the adjusting mechanism of the cam, the scale and the indicator become useful auxiliaries.

Figure 5:
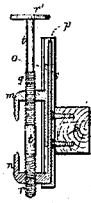

Furthermore, there is to be applied to the said bar a suitable number of dogging mechanisms or devices for holding a log in connection with the bar, one of such mechanisms being exhibited in the drawing, Figure 5 being a vertical section of it and the bar E.

This dogging mechanism consists of two toothed jaws, *m n*, formed as represented, extended from the rectangular plates *o p*, and arranged in two right and left screws, *q r*, which are cut or made on a vertical rod, *t*, provided with a head, *r'*.

The larger of the plates *o p* rests on a vertical guide, *s*, applied to the bar E, and made and so applied to the plate as to allow it, with the jaws and their screw-rod, to move freely up and down vertically.

On revolving the rod *t* in one direction the jaws will be caused to approach each other, they being made to recede from one another when the rod is revolved in the opposite way.

A log, preparatory to being sawed off into lumber, is to be laid on the grooved bars C C of the frame B, and is to be held in connection with the bar E by the jaws of the dogging mechanisms, which, on the screw-rods being revolved in the right direction, will adapt themselves to the log, and grasp it firmly on its opposite sides.

Owing to the peculiar construction of the dogging mechanism it will be seen that when one of its jaws, however set in the log, the other will continue to move toward the log until it may become set therein. It will also be observed that while the inner half of the log may be in the act of being moved laterally off the ends of the bars C C, the dogging mechanisms will be free to move downward, and will so move as to enable the log to take a proper bearing on the uppermost parts of the said ends of the bars C C.

Furthermore, it will be seen that as soon as the longer pawl, by its action against the rearmost tooth of the rack, may have advanced the rack to the extent of the forward movement of the pawl, no further advance of the bar E and the log can take place, notwithstanding the carriage B may continue in movement. Thus all danger of bringing the dogging mechanisms in contact with the saw is prevented.

In the above explained machinery for holding a log and presenting and moving it, with reference to a saw, for the purpose of being sawed thereby into lumber,

I claim as my invention the following, that is to say:

1. The combination and arrangement of the carriage B, its grooved ways C C, the bar or carrier E, the jaws $m$ $n$, right and left screws $q$ $r$, rod $t$, support plates $o$ $p$, carrier and guide $s$, shaft F, wheels G G, bands $a$ $b$ $a$ $b$, rack H, slider I, the pawl or pawls $c$ $d$, stud $e$, cams K L, the toothed wheel M, catch-lever N, and cam O, the whole being applied and to operate together, substantially in manner as explained, so as to constitute an improved head-block for sawmills, whereby, by whose operation, a log may be supported and presented and moved with reference to a saw, in manner as explained.

2. The combination for advancing the log bar E, the same consisting of the shaft F, wheels G G, bands $a$ $b$ $a$ $b$, the rack H, the slider I, its pawl or pawls $c$ $d$, the stud $e$, and the stationary cam K, and the adjustable cam L, the whole being arranged substantially in manner and so as to operate as set forth.

CHAS. M. FLINT.

Witnesses:
R. H. EDDY,
J. R. SNOW.